United States Patent [19]
McCoy

[11] 3,838,536
[45] Oct. 1, 1974

[54] METHOD AND APPARATUS FOR PLUGGING REACTOR TUBES

[75] Inventor: John D. McCoy, Gibsonia, Pa.

[73] Assignee: Gulf Research & Development Company, Pittsburgh, Pa.

[22] Filed: Sept. 25, 1972

[21] Appl. No.: 291,581

[52] U.S. Cl. ............. 48/94, 48/196 R, 48/197 R, 48/214, 23/288 M, 137/340, 423/659
[51] Int. Cl. ............................................ C01b 1/18
[58] Field of Search...... 48/197 R, 196 R, 119, 123, 48/94, 214, 89; 137/310, 340, 216.1, 251, 137/74; 134/24; 176/38; 23/288 M, 288 R, 23/252 R; 239/265.15; 122/504.1; 423/650, 659

[56] References Cited
UNITED STATES PATENTS

| | | | |
|---|---|---|---|
| 2,701,755 | 2/1955 | Strasser.................................. | 48/78 |
| 3,062,197 | 11/1962 | Fleischer............................. | 122/510 |
| 3,595,628 | 11/1968 | Connor et al........................ | 23/288 |
| 3,607,130 | 9/1971 | Worley............................... | 23/288 M |
| 3,645,701 | 2/1972 | Banchik et al. .................. | 23/288 M |
| 3,671,198 | 6/1972 | Wallace................................ | 23/277 |

FOREIGN PATENTS OR APPLICATIONS

| | | | |
|---|---|---|---|
| 1,114,567 | 5/1968 | Great Britain....................... | 176/31 |

*Primary Examiner*—S. Leon Bashore
*Assistant Examiner*—Peter F. Kratz

[57] ABSTRACT

Particles of a fusible material having a melting point preferably several hundred degrees higher than the reaction temperature are supported in the lower end of a vertical reactor tube arranged in a heater parallel with other reactor tubes. If it is desired to take a reactor tube out of service, flow into the inlet end is stopped by closing a valve. The resulting increase in temperature within the reactor tube melts the fusible material which flows through the reactor tube out of the furnace and freezes to plug the outlet line from the reactor tube. The invention is particularly useful in steam-hydrocarbon reforming processes for the production of hydrogen utilizing an aluminum-bronze alloy as the fusible material.

8 Claims, 2 Drawing Figures

METHOD AND APPARATUS FOR PLUGGING REACTOR TUBES

This invention relates to a method for plugging reactor tubes used in high temperature operations when it is desired to remove a reactor tube from service while continuing operation in other reactor tubes connected in parallel to the reactor tube to be removed from service.

In some high temperature processing operations, reactants are passed through a plurality of reactor tubes connected in parallel through a reaction zone in which the reactants are heated to a temperature at which a desired reaction will proceed. A typical process utilizing a large number of reactor tubes connected in parallel is the steam-hydrocarbon reforming process for the production of hydrogen, and this invention will be described as it is used in the process. In the steam-hydrocarbon reforming process a mixture of steam and hydrocarbons is preheated to a temperature below the desired reaction temperature in a relatively low temperature zone such as a convection zone of a furnace. The preheated mixture of steam and hydrocarbons is delivered from the preheater into an inlet header and from the header into a plurality of vertical reactor tubes passing through a high temperature zone of a furnace in which the mixture of steam and hydrocarbons is heated to a temperature ordinarily in the range of 1,400° – 1,800° F., depending upon the particular hydrocarbon feedstock that is used. Hot reaction products discharged from the reactor tubes flow into a collection header from which the reaction products flow into heat transfer equipment for recovery of heat from the reaction products and then into processing equipment for separating the individual constituents of the reaction products.

The connection between the inlet header and the reactor tubes and the collection header and the reactor tubes is by means of curved tubes, ordinarily referred to as pig tails, of smaller diameter than the reactor tubes. Because of the extremely high temperature at which the reactor tubes operate, it is desirable not to shut down the heater when a reactor tube fails to avoid subjecting the tubes to extreme temperature changes. To allow shutdown of individual reactor tubes, each of the inlet pig tails at the upper end of the reactor tubes is equipped with a valve. The high temperature of the reaction products precludes using valves in the outlet pig tails. To prevent blowback of reaction products from the collection headers through a reactor tube which has been cut off from the inlet header by the valve in the upper pig tail, some operators crimp the outlet pig tail connected to a reactor tube that has failed. Because of the extremely high temperature of the reaction products in the collection header and the highly inflammable mixture of volatile hydrocarbons and hydrogen in the reaction products, it is desirable to avoid the dangers inherent in crimping the outlet pig tail.

This invention resides in a method and apparatus for plugging the outlet pig tail of a reactor tube when the reactor tube is removed from service by placing in the lower end of the reactor tube within the heater particles of a fusible material that will remain solid at the temperatures reached by the reaction products but will melt at a temperature higher than the normal reaction temperature. When flow through a reactor tube is stopped by closing the valve in the inlet pig tail to that reactor tube, the particles of fusible material are no longer cooled by the reaction products and the temperature within the reactor tube rises to a level at which the fusible material melts and flows into the outlet pig tail. The molten material freezes at the lower temperature in the outlet pig tail and thereby plugs the pig tail and isolates the reactor tube from the collection header.

Figures 1, 2:
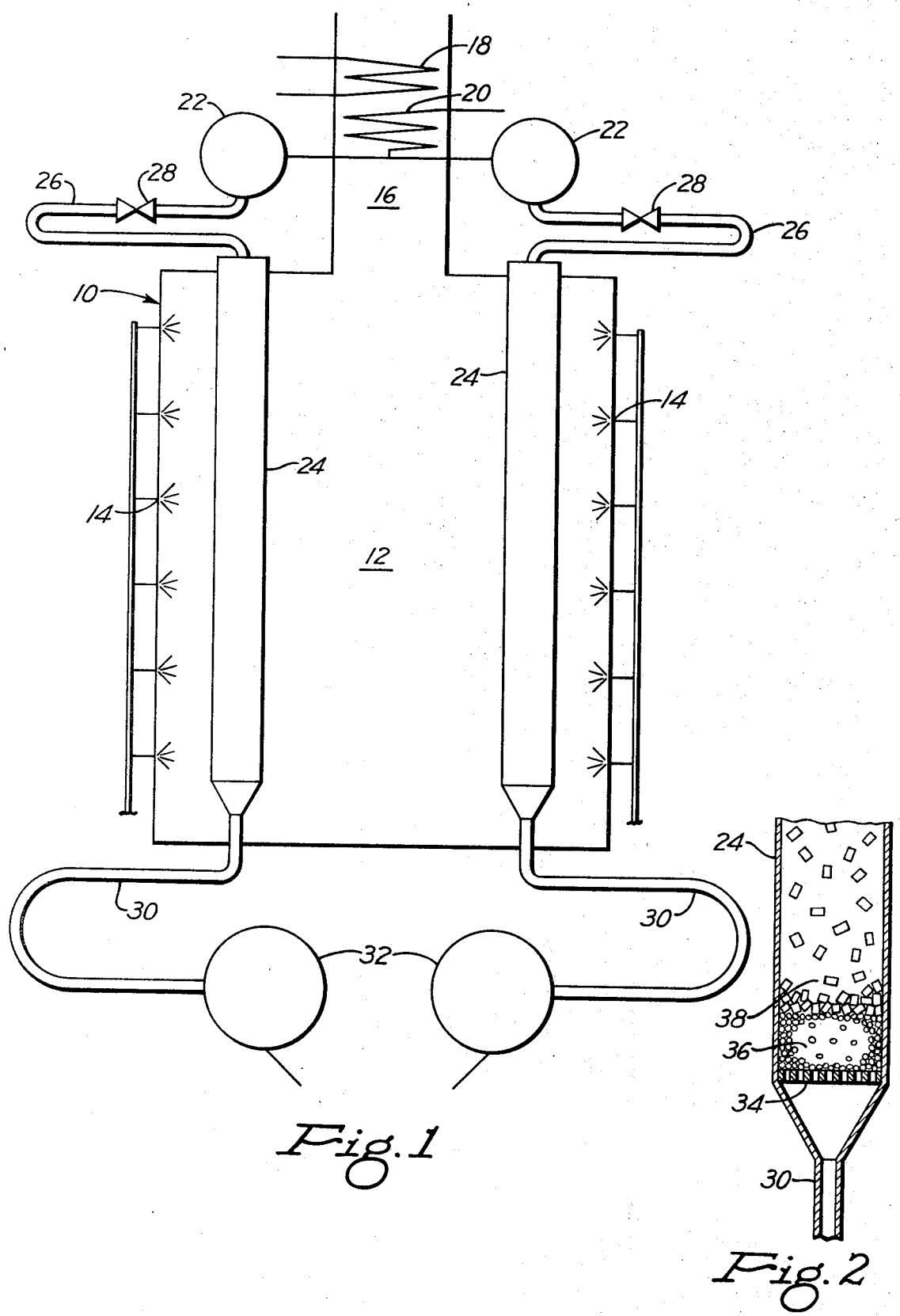
FIG. 1 is a diagrammatic view in elevation of a heater for a steam-hydrocarbon reformer for the production of hydrogen.
FIG. 2 is a vertical sectional view of the lower end of a reactor tube showing the location of the particles of fusible material used in this invention.

For the purpose of illustration, this invention will be described with reference to a steam-hydrocarbon reforming process.

Referring to FIG. 1, a heater, indicated generally by reference numeral 10, for a steam-hydrocarbon reformer has a radiant section 12 with a plurality of burners 14 along its walls to provide a very high temperature for heating a mixture of steam and hydrocarbons to a temperature at which the steam and hydrocarbons react to produce hydrogen. At the upper end of heater 10 is a convection section 16 which may contain steam generating coils 18. Convection section 16 delivers gases to a stack; however, other heat transfer equipment may be provided downstream of steam generator 18. The particular furnace design is not a part of this invention and this invention is not limited to any particular arrangement of heat recovery apparatus in the furnace.

In convection section 16 of the furnace is a preheater 20 for preheating the mixture of steam and hydrocarbons to a temperature, such as 600° to 800°F., below the temperature at which the reforming reaction proceeds. The reaction temperature used in the reforming process will depend upon the particular hydrocarbons used as feedstock and may range from as low as about 1,400° when naphtha is used as feedstock to as high as about 1,800° when methane is the feedstock.

The preheated mixture of steam and hydrocarbons is delivered from the preheater 20 into inlet headers 22. In the embodiment illustrated in FIG. 1 of the drawings, the heater 10 is provided with two banks of reactor tubes 24. Each bank of reactor tubes consists of a large number of reactor tubes connected in parallel and is connected to a separate inlet header 22. As many as 100, or even more, reactor tubes may be connected to a single inlet header. Connection of the upper inlet end of each of the reactor tubes 24 with the appropriate inlet header 22 is by means of an inlet pig tail 26. A valve 28 in each of the inlet pig tails allows flow from the inlet header 22 to any individual reactor tube 24 to be stopped while flow to the other reactor tubes continues.

The lower end of each of the reactor tubes tapers downwardly and is connected within the firebox of heater 10 to an outlet pig tail 30. Each of the outlet pig tails 30 is connected into a collection header 32 into which the reaction products are discharged for delivery to suitable equipment for heat recovery and further processing not related to this invention.

Reactor tubes 24 are castings capable of withstanding the extremely high temperatures within the radiant section 12 of the heater 10. A typical alloy that can be used in the reactor tubes is a ferrous alloy containing 25 percent chromium and 20 percent nickel. The reactor tubes ordinarily have a diameter in the range of 4 to 7 inches whereas the diameter of the pig tails is preferably in the range of 1 ½ to 2 inches. Pig tails 26 and 30 are in the form of loops which provide substantial flexibility for withstanding shrinkage or elongation of the reactor tubes resulting from temperature changes in the reactor tubes.

Referring to FIG. 2, a grate 34 in the lower end of each of the reactor tubes 24 supports particles 36 in the form of pellets or balls of a fusible material that will melt at the desired temperature, which is preferably approximately 200° above the temperature of the reactants in the reactor tube. The pellets are of a size such that they will form a permeable mass that does not interfere with flow of reaction products through the reactor tubes. Balls ¼ inch to 1 inch in diameter are suitable. The reactor tube 34 is filled above fusible material 36 with particles 38 of the catalyst used in the steam-hydrocarbon reforming process. A typical catalyst is an inert support impregnated with nickel. The particular catalyst used is not a part of this invention, and this invention is not restricted to use with any particular catalyst.

The particular fusible material used in the preparation of particles 36 depends largely upon what hydrocarbons are used as feedstock, because the reaction temperature depends on the feedstock used. The fusible material should melt at a temperature exceeding the reaction temperature by enough that the melting point will not be reached during periods of upset operations. A melting point of the fusible material 150° to 300° F. above the reaction temperature is satisfactory. It is also desirable that the fusible material have a narrow melting point whereby the particles of alloy will melt within a short time interval as the temperature in the fracture tube rises. Suitable fusible materials that can be used are aluminum-bronze alloys. For example, if it is desired that the particles 36 melt at a temperature of about alloy 1,900° F. an lloy containing 91 percent copper and 9 percent aluminum can be used. If it is desired that the particles melt at a higher temperature, an alloy containing 95 percent copper and 5 percent aluminum that melts at a temperature of 1,940° F. can be used. If the reaction temperature during normal operations is lower, for example in the range of 1,450° to 1,500° F., the particles 36 can be of Muntz metal, an alloy containing 60 percent copper and 40 percent zinc. That alloy melts at a temperature of 1,600° F. Alloys are particularly useful in this invention because of the range of melting points they make available, but the particles 36 are not restricted to alloys and can be made of a relatively pure material such as copper which melts at a temperature of 1,981° F. It is further desirable that the particles be coated with a material such as aluminum capable of withstanding corrosion or other attack by reactants passing through the reactor tube. The aluminum is converted to a protective oxide film as the temperature in the reactor is raised to the reforming temperature.

In the operation of this invention, the steam and hydrocarbon mixture is passed through preheater 20 into inlet headers 22. The reactant mixture then flows through the inlet pig tails to the upper end of the reactor tubes 24 and downwardly through the catalyst 38 within the reactor tube in which the temperature is raised to the reforming temperature. The reaction products continue through the permeable mass of fusible particles 36 and out of the reactor tube 24 into the outlet pig tail 30 for delivery into collection headers 32. If observation of the reactor tubes indicates that one of the reactor tubes is leaking, that reactor tube is taken out of service by closing the valve 28 in the inlet pig tail to that reactor tube. Once flow of reactants through the reactor tube ceases, the temperature in the reactor tube rises to a level at which the fusible particles 36 melt and flow into outlet pig tail 30. The melted material is cooled in the outlet pig tail 30 which is at a temperature substantially below the melting point of the material. Freezing of the fusible material plugs the pig tail 30 to isolate the reactor tube from the reaction products in the collection headers 32.

This invention provides a safe method of isolating a reactor tube from service with other reactor tubes connected in parallel therewith when valves cannot be used because of high temperatures or other severe conditions. It is particularly useful in the steam-hydrocarbon reforming process for producing hydrogen because of the very high temperatures reached by the reaction products and the high inflammable reaction products, but is suitable for use wherever a plurality of tubes connected in parallel are exposed to high temperatures and a fusible material will when melted drain to a lower temperature zone and freeze to seal the outlet of the tube.

I claim:

1. A method of plugging the outlet end of a reactor tube extending vertically through a heater and connected at its outlet end to a conduit passing to a zone at a lower temperature than the normal temperature in the reactor tube comprising supporting in the reactor tube within the heater adjacent the outlet end of the reactor tube particles of a material fusible at a temperature above the normal temperature in the reactor tube and below the temperature of the heater outside of the tube and closing the inlet end of the reactor tube whereby on stopping flow into the inlet end of the reactor tube the fusible material melts and flows from the reactor tube into the lower temperature zone in which the fusible material freezes and blocks flow into the outlet end of the tube.

2. A method as set forth in claim 1 in which the reactor tube is for a steam-hydrocarbon reforming process to produce hydrogen, the normal temperature in the reactor tube is in the range of 1,400° – 1,800° F. and the melting point of the fusible material is approximately 200° F. above the normal temperature of the reactants in the reactor tube.

3. In a heater for a reactor having a plurality of reactor tubes connected in parallel to an inlet header and extending downwardly through a radiant zone of the heater to a collection header outside of the heater and inlet valves for each of the reactor tubes, the improvement comprising grids positioned in the lower end of the reactor tubes within the radiant zone of the heater and particles of a fusible material supported on the grids to form a permeable mass in each of the reactor tubes, the fusible material having a melting point higher than the temperature in the reactor tubes during normal operation and lower than the temperature in the radiant zone of the heater.

4. Apparatus for steam-hydrocarbon reforming to produce hydrogen comprising a radiant zone of a furnace, an inlet header positioned outside of and above the furnace, a plurality of reactor tubes extending in parallel downwardly through the combustion zone of the furnace, an inlet pig tail connecting the inlet end of each of the reactor tubes with the inlet header, a valve in each of the inlet pig tails, a collection header outside of the furnace near the lower end of the reactor tubes, an outlet pig tail connecting the lower end of each of the reactor tubes to the collection header, a grid within the furnace in the lower end of each of the reactor tubes, and particles of a fusible material supported on the grids, the fusible material having a melting point higher than the reaction temperature and lower than the temperature in the radiant section outside the reactor tubes.

5. A method as set forth in claim 1 in which the reactor tube is for a steam-hydrocarbon reforming process to produce hydrogen, the normal temperature in the reactor tube is in the range of 1,400° to 1,800° F. and the melting point of the fusible material is in the range of 150° to 300° F. above the normal temperature in the reactor tube.

6. In a reactor tube for use in parallel with other reactor tubes extending vertically through a heater, the improvement comprising a grid positioned within the heater in the lower end of the reactor tube, and a permeable mass of particles of a fusible material supported on the grid, the fusible material having a melting point between the normal temperature in the reactor tube and the temperature in the heater outside of the reactor tube.

7. Apparatus as set forth in claim 6 including a permeable mass of catalyst particles in the reactor tube above the permeable mass of particles of fusible material.

8. Apparatus as set forth in claim 6 in which the particles of fusible material are coated with a material resistant to attack by reactants passing through the reactor tube.

* * * * *